United States Patent
Lin

(10) Patent No.: US 11,618,379 B2
(45) Date of Patent: Apr. 4, 2023

(54) VEHICLE REARVIEW WARNING SYSTEM

(71) Applicant: AEON MOTOR CO., LTD., Tainan (TW)

(72) Inventor: Tong-Min Lin, Tainan (TW)

(73) Assignee: Aeon Motor Co., Ltd., Tainan (TW)

( * ) Notice: Subject to any disclaimer, the term of this patent is extended or adjusted under 35 U.S.C. 154(b) by 0 days.

(21) Appl. No.: 17/457,026

(22) Filed: Nov. 30, 2021

(65) Prior Publication Data

US 2022/0371510 A1    Nov. 24, 2022

(30) Foreign Application Priority Data

May 24, 2021   (TW) .................................. 110118695

(51) Int. Cl.
```
B60Q 9/00      (2006.01)
G08G 1/16      (2006.01)
H04L 67/12     (2022.01)
G06V 20/58     (2022.01)
B60R 1/12      (2006.01)
B62J 6/24      (2020.01)
G08G 1/01      (2006.01)
```
(52) U.S. Cl.
CPC .............. *B60Q 9/00* (2013.01); *B60R 1/1207* (2013.01); *B62J 6/24* (2020.02); *G06V 20/58* (2022.01); *G08G 1/0104* (2013.01); *G08G 1/166* (2013.01); *G08G 1/167* (2013.01); *H04L 67/12* (2013.01)

(58) Field of Classification Search
CPC ... B60Q 9/00; B62J 6/24; G06V 20/58; B60R 1/1207; G08G 1/0104; G08G 1/166; G08G 1/167; H04L 67/12
See application file for complete search history.

(56) References Cited

U.S. PATENT DOCUMENTS

| | | | | |
|---|---|---|---|---|
| 8,035,495 B2* | 10/2011 | Oh | ........................ | B60R 1/00 348/148 |
| 10,460,703 B2* | 10/2019 | Katsuyama | .............. | B60R 1/00 |
| 2010/0001850 A1* | 1/2010 | Oh | ........................ | B60R 1/00 340/438 |
| 2014/0002658 A1* | 1/2014 | Kim | ..................... | G06V 10/44 348/148 |
| 2015/0228066 A1* | 8/2015 | Farb | ..................... | G06V 20/58 348/148 |

(Continued)

FOREIGN PATENT DOCUMENTS

| | | | | |
|---|---|---|---|---|
| CN | 202593712 U | * | 12/2012 | |
| CN | 106225787 A | * | 12/2016 | ............ G01C 21/20 |

(Continued)

*Primary Examiner* — Chico A Foxx
(74) *Attorney, Agent, or Firm* — Rosenberg, Klein & Lee

(57) ABSTRACT

A vehicle rearview warning system has a rearview-mirror monitor, a front image-capturing device outputting a front driving image, a rear image-capturing device outputting a rear driving image, and an edge computing device signally connected to the rearview-mirror monitor, the front image-capturing device, and the rear image-capturing device. The edge computing device receives the front driving image and the rear driving image respectively, recognizes a vehicle object from the front driving image or the rear driving image, and determines whether to activate the rearview-mirror monitor to display a warning image according to the vehicle object.

5 Claims, 14 Drawing Sheets

(56) References Cited

U.S. PATENT DOCUMENTS

| | | | | |
|---|---|---|---|---|
| 2017/0158200 A1* | 6/2017 | Wu | ........................ | B60W 40/09 |
| 2018/0181824 A1* | 6/2018 | Ishii | ........................ | G08G 1/166 |
| 2018/0301122 A1* | 10/2018 | Katsuyama | ................ | B60R 1/00 |
| 2020/0282990 A1* | 9/2020 | Sato | ................ | B60W 60/00182 |
| 2021/0170946 A1* | 6/2021 | Yoshida | ................ | H04N 5/2628 |
| 2021/0221368 A1* | 7/2021 | Lavi | ........................ | G06V 20/56 |

FOREIGN PATENT DOCUMENTS

| | | | | |
|---|---|---|---|---|
| CN | 107403404 A | * | 11/2017 | |
| KR | 20140004291 A | * | 1/2014 | |

\* cited by examiner

VEHICLE REARVIEW WARNING SYSTEM

CROSS REFERENCE TO RELATED APPLICATIONS

The present application claims priority to Taiwan application No. 110118695, filed on May 24, 2021, the content of which is hereby incorporated by reference in its entirety.

BACKGROUND OF THE INVENTION

1. Field of the Invention

The present application relates generally to a warning system, and more particularly to a vehicle rearview warning system.

2. Description of Related Art

When driving a vehicle, a driver usually focuses attention on the road conditions in front of the vehicle, and in addition, the driver may know whether another vehicle is approaching by watching a reflected scene on the rearview mirror. Besides, the road circumstances are very complicated. For example, there would be vehicles, pedestrians, animals, traffic lights, traffic signs, traffic islands, road lane markings, and so on. Given the various road conditions, the driver frequently has to make a decision on a next driving action. For example, the driver may determine whether to overtake a front car, decelerate the vehicle, cross the intersection while the traffic light is still green but will turn to red in a second, and so on.

Therefore, the driving decisions made by the drivers are closely related to traffic safety. If the driving decisions are made timely or properly by the drivers, the driving decisions would be greatly helpful for the whole traffic safety. In contrast, if the driver has hesitation in driving the vehicle or lacks awareness, the driver may miss the best timing to make the driving decision, increasing the chance of traffic accidents.

For example, a driver rides a scooter. Before the rider reaches the intersection, the rider may see a large vehicle, such as a bus, stopping at the intersection due to the red traffic light. When the rider keeps riding forward, the rider may reach the intersection and then stop the scooter near the bus. The scooter may be just located in the blind spot area of the bus driver. When the traffic light is switched to green and the bus would turn its direction, a collision between the bus and the scooter may happen because of the inner wheel difference of the bus, causing the traffic accident.

SUMMARY OF THE INVENTION

An objective of the present invention is to provide a vehicle rearview warning system to timely and properly output a warning to assist the driver when driving. The driver may enhance the awareness after observing the warning and then adopt an action, in order to reduce the risk of traffic accidents and to improve the traffic safety.

The vehicle rearview warning system of the present invention comprises a rearview-mirror monitor, a front image-capturing device outputting a front driving image, a rear image-capturing device outputting a rear driving image, and an edge computing device signally connected to the rearview-mirror monitor, the front image-capturing device, and the rear image-capturing device. The edge computing device receives the front driving image and the rear driving image respectively, recognizes a vehicle object from the front driving image or the rear driving image, and determines whether to activate the rearview-mirror monitor to display a warning image according to the vehicle object.

According to the vehicle rearview warning system of the present invention, the front image-capturing device and the rear image-capturing device respectively capture images in front of and behind the vehicle, so as to monitor both road conditions in front of and behind the vehicle. Besides, the edge computing device performs an artificial intelligence (AI) detection technique to recognize the vehicle object from the front driving image and the rear driving image, such that the edge computing device has accurate recognition capability. In the present invention, the warning image is displayed on the rearview-mirror monitor, such that the driver is provided with direct warning effect. In other words, when the driver observes the warning image on the rearview-mirror monitor, the driver may timely adopt an action at a proper timing, such as to make a decision whether to accelerate the vehicle, overtake a front car, decelerate the vehicle, park the vehicle at the road side, and so on, for the purpose of implementation of driving safety.

For example, when a rider of a scoter observes the warning image on the rearview-mirror monitor, the scooter has not entered the blind spot area of a bus yet. The rider may determine not to enter the blind spot area of a bus, so as to park the scooter at the road side or follow behind the bus. The rider may wait for moving forward until the bus finishes a turning, so as to effectively avoid a traffic accident with the bus.

BRIEF DESCRIPTION OF THE DRAWINGS

FIG. 4A and FIG. 4B are schematic views of the rearview-mirror monitor of the present invention applied to a car, wherein FIG. 4B is a partial enlarged view of FIG. 4A;

DETAILED DESCRIPTION OF PREFERRED EMBODIMENT(S)

The vehicle rearview warning system of the present invention is provided to be installed on a vehicle. The vehicle may be driven by a person. The description to the embodiment of the present invention is in a first-person narrative, so the vehicle may be also called a host vehicle. The present invention can determine whether other vehicles approach the host vehicle, and timely offer a warning to the driver. The vehicle for which the present invention is applied may be an electric vehicle, a vehicle powered by fuel (such as petrol and diesel), or a hybrid electric vehicle. Or for example, the vehicle to which the present invention is applied may be a scooter, a heavy motorcycle, a sedan, a bus, a truck, or an engineering vehicle. The vehicle to which the present invention is applied is not limited to the above-mentioned vehicles.

Figure 1:
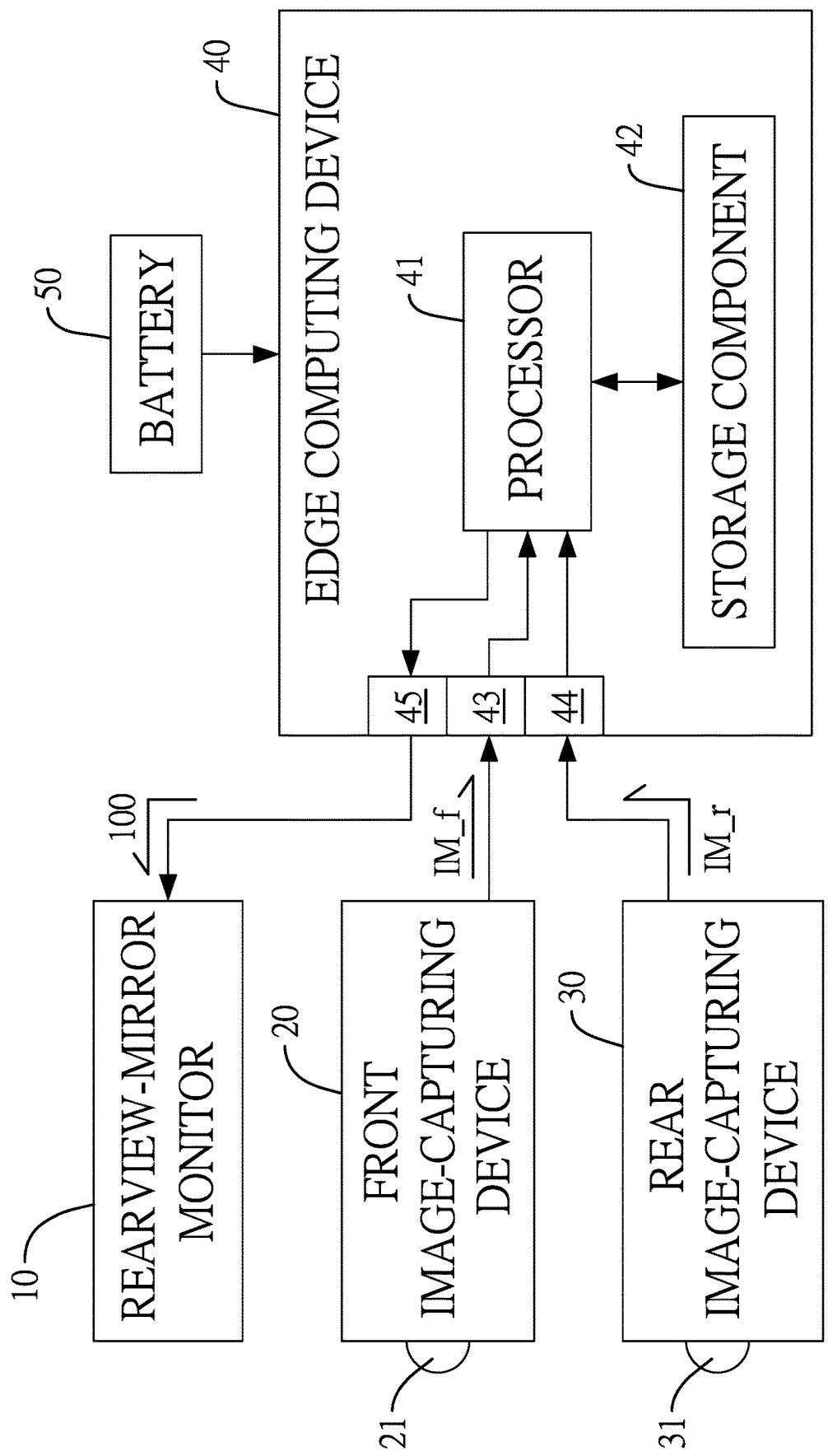
FIG. 1 is a block diagram of an embodiment of the vehicle rearview warning system of the present invention.

With reference to FIG. 1, an embodiment of the vehicle rearview warning system of the present invention comprises a rearview-mirror monitor 10, a front image-capturing device 20, a rear image-capturing device 30, and an edge computing device 40. The system of the present invention may derive electric power from a battery 50 of the vehicle.

Figure 2:
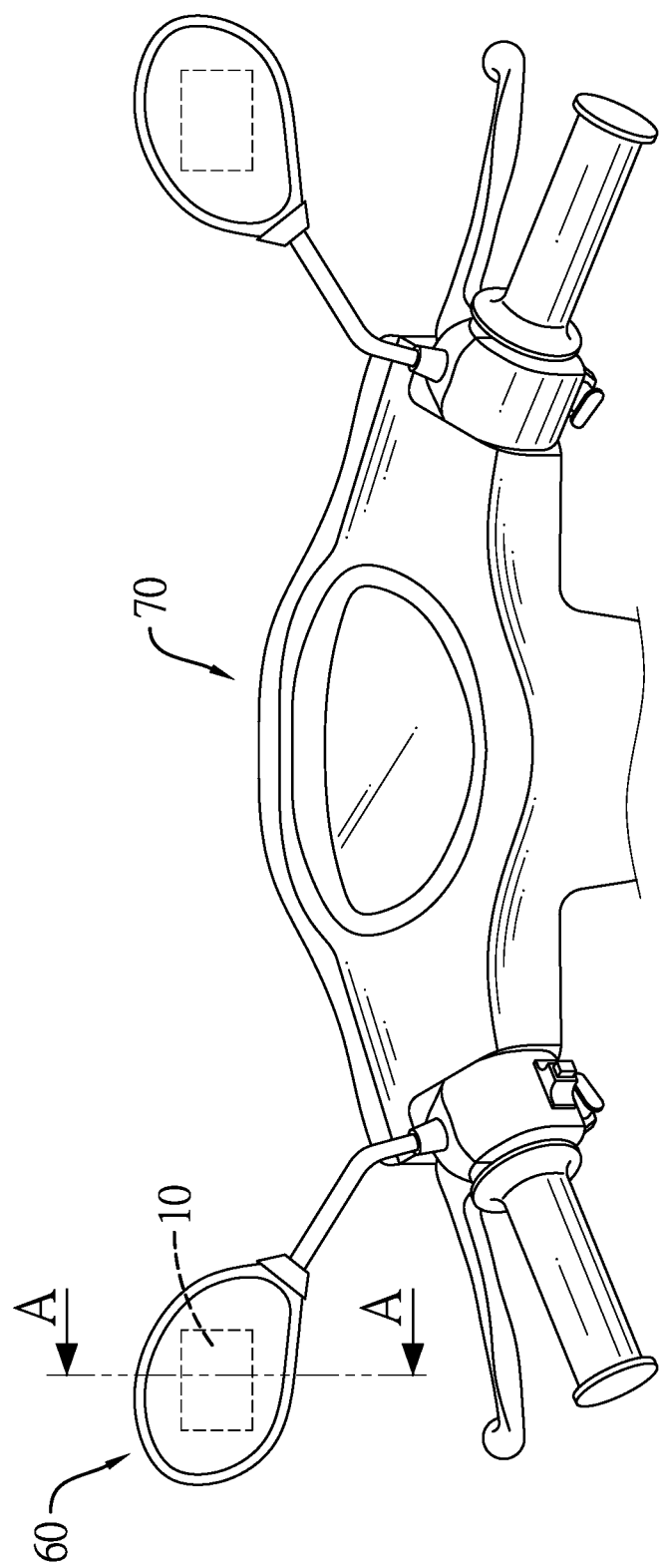
FIG. 2 is a schematic view of the rearview-mirror monitor of the present invention applied to a scooter.
Figure 3:
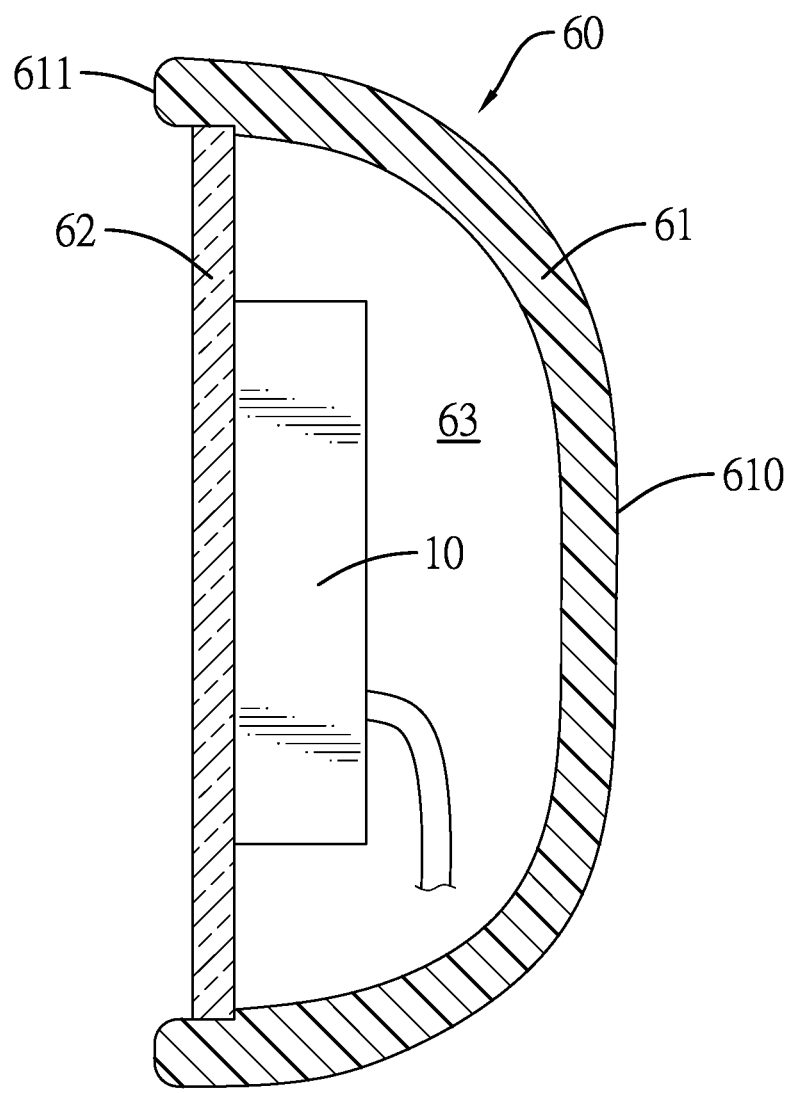
FIG. 3 is a schematic cross-sectional view of the rearview-mirror monitor of the present invention applied to a rearview-mirror assembly.
Figure 4A:
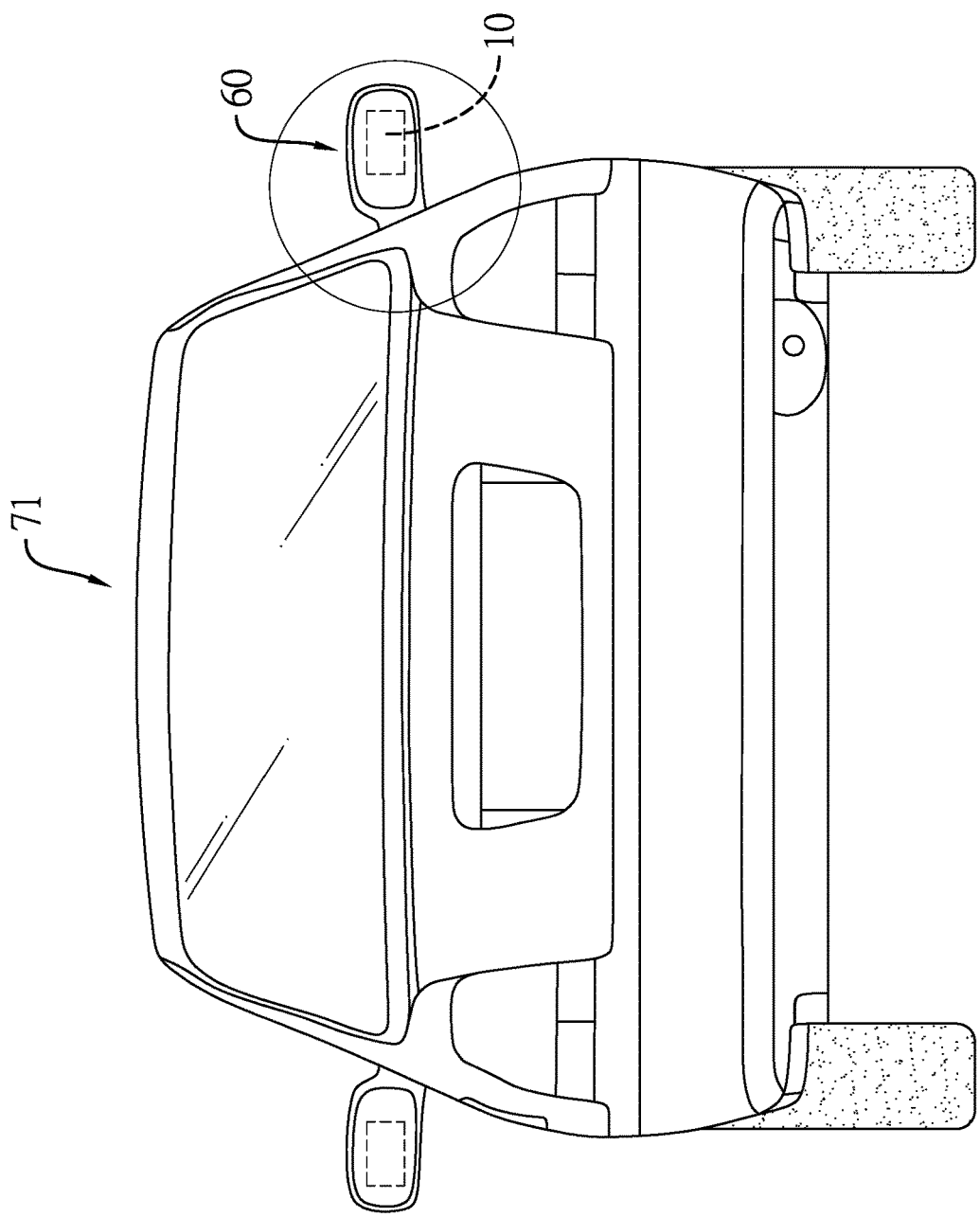
Figure 4B:
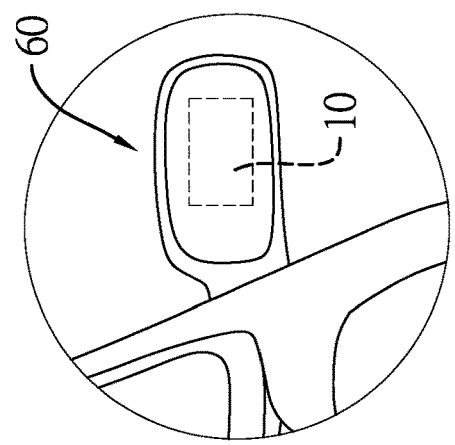

The rearview-mirror monitor 10 may be a liquid crystal display (LCD) as an example, but not limited to LCD. The rearview-mirror monitor 10 may be driven to display static or dynamic images. In general, the rearview-mirror monitor 10 can be combined with a mirror of a rearview-mirror assembly of the vehicle. With reference to FIG. 2 and FIG. 3, they depict that the rearview-mirror monitor 10 is applied to the rearview-mirror assembly 60 of a scooter 70. The rearview-mirror assembly 60 essentially comprises a mirror base 61 and a mirror 62. A front side 610 of the mirror base 61 looks on the front of the scooter 70. A back side 611 of the mirror base 61 looks on the back of the scooter 70. The mirror 62 is mounted on the back side 611 of the mirror base 61. A containing space 63 is formed between the mirror base 61 and the mirror 62. The rearview-mirror monitor 10 is mounted in the containing space 63. The mirror 62 may be a light-transmittable and reflective mirror. A surface of a screen of the rearview-mirror monitor 10 may be attached to the mirror 62, such that the images displayed on the screen of the rearview-mirror monitor 10 may pass through the mirror 62. When a person watches the mirror 62, the person can see not only the scene reflected by the mirror 62, but also the images displayed by the rearview-mirror monitor 10. With reference to FIGS. 4A and 4B, they depict an example that the rearview-mirror monitor 10 is applied to the rearview-mirror assembly 60 of a car 71.

Figure 5:
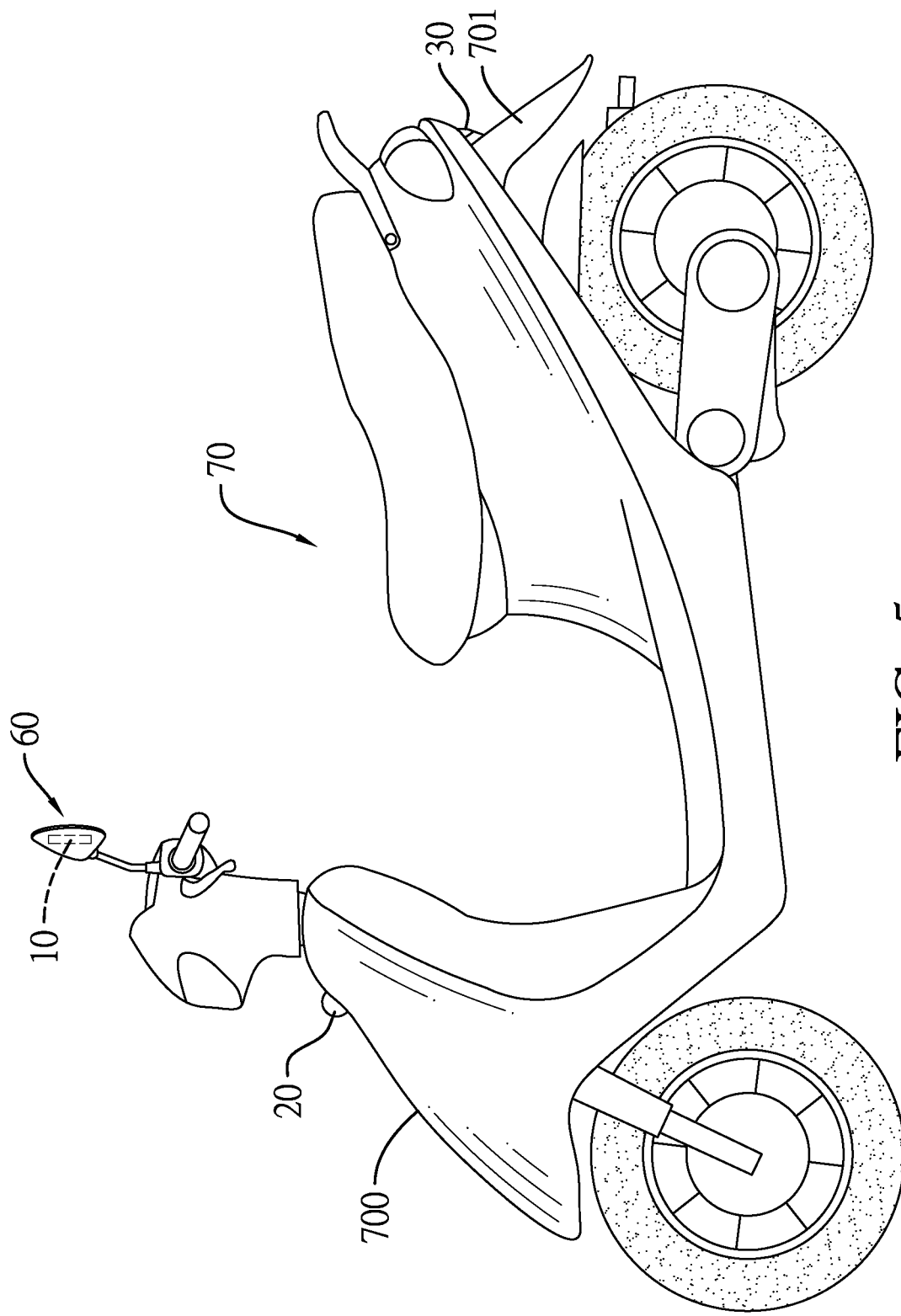
FIG. 5 is a schematic view of the rearview-mirror monitor, the front image-capturing device, and the rear image-capturing device of the present invention applied to a scooter.
Figure 6:
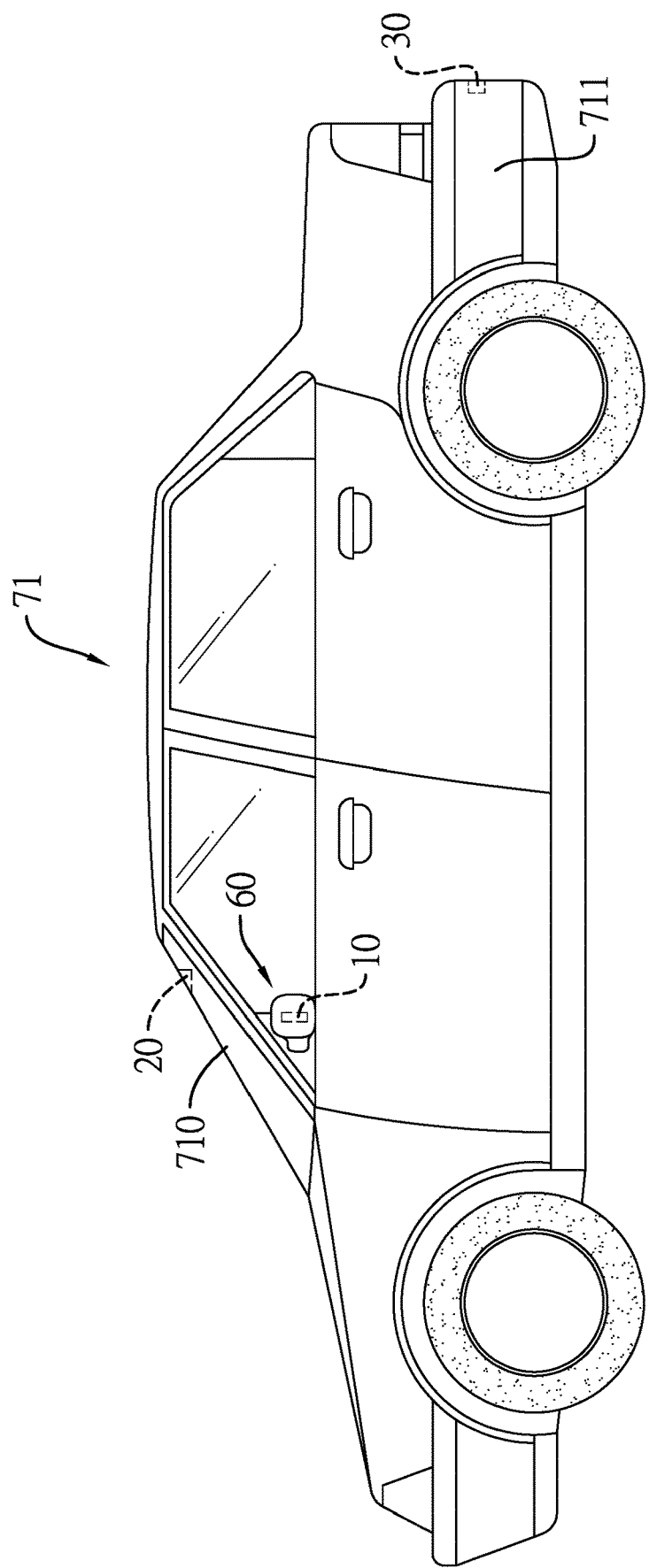
FIG. 6 is a schematic view of the rearview-mirror monitor, the front image-capturing device, and the rear image-capturing device of the present invention applied to a car.
Figure 7:
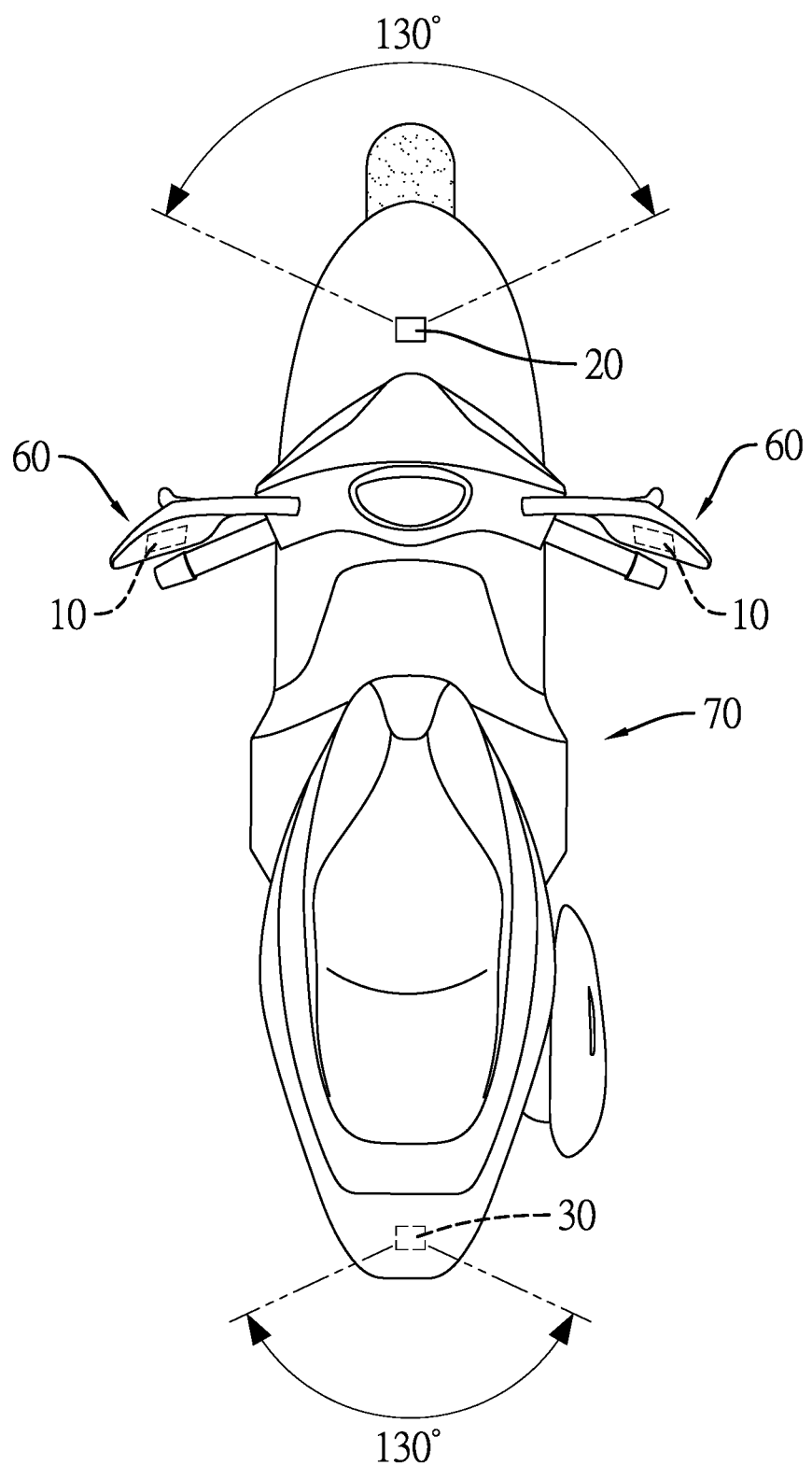
FIG. 7 is a schematic view of each one of the front image-capturing device and the rear image-capturing device having an image-capturing range of 130 degrees.

The front image-capturing device 20 is mounted on a front side of the vehicle to capture the scene in front of the vehicle. The rear image-capturing device 30 is mounted on a back side of the vehicle to capture the scene behind the vehicle. For example, the front image-capturing device 20 and the rear image-capturing device 30 may be cameras, such as vehicle digital-video-recorders (vehicle DVR). In the embodiment of the present invention, the image outputted by the front image-capturing device 20 is defined as a front driving image IM_f, and the image outputted by the rear image-capturing device 30 is defined as a rear driving image IM_r. With reference to FIG. 5 as an example, it depicts that the front image-capturing device 20 and the rear image-capturing device 30 are applied on the scooter 70. The front image-capturing device 20 is mounted on a front panel 700 of the scooter 70. The rear image-capturing device 30 is mounted on a rear fender 701. With further reference to FIG. 6 as another example, it depicts that the front image-capturing device 20 and the rear image-capturing device 30 are applied on the car 71. The front image-capturing device 20 is mounted on an interior side of a front windshield 710 of the car 71. The rear image-capturing device 30 is mounted on a back 711, such as on a rear bumper or near a license plate, of the car 71. Preferably, the front image-capturing device 20 and the rear image-capturing device 30 are equipped with wide-angle lenses 21, 31 respectively. With reference to FIG. 7 depicting a top view of the scooter 70, through the wide-angle lenses 21, 31, each one of the front image-capturing device 20 and the rear image-capturing device 30 may have an image-capturing range of 130 degrees.

The edge computing device 40 is for being mounted in the vehicle and signally connected to the rearview-mirror monitor 10, the front image-capturing device 20, and the rear image-capturing device 30. The edge computing device 40 has functions including data transmitting, data collecting, data processing, data storing, and so on. In the embodiment of the present invention, the edge computing device 40 comprises a processor 41, a storage component 42, a first communication interface 43, a second communication interface 44, and a third communication interface 45. The storage component 42, the first communication interface 43, the second communication interface 44, and the third communication interface 45 are electrically connected to the processor 41.

Figure 8:
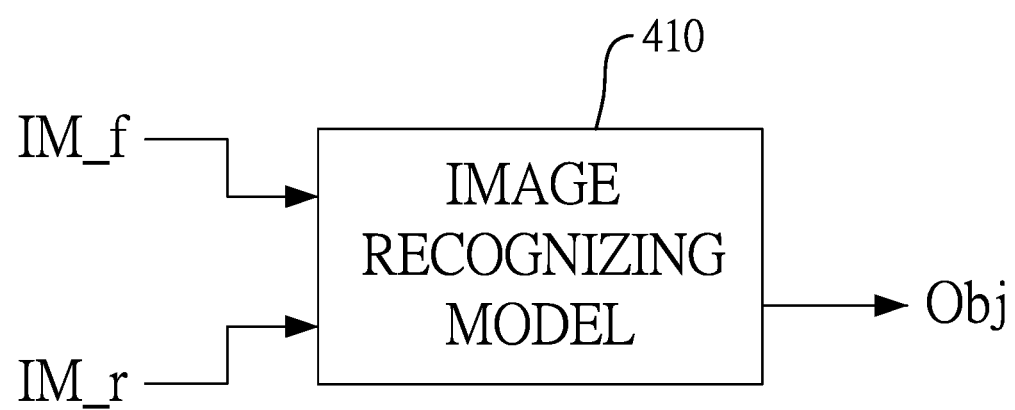
FIG. 8 is a schematic view of the image recognizing model recognizing the vehicle object from the front driving image or the rear driving image.

The processor 41 may be an integrated circuit chip (IC chip), such as but not limited to central processing unit (CPU), graphics processing unit (GPU), digital signal processor (DSP), or electronic control unit (ECU). The storage component 42 may be a memory or a memory card. With reference to FIG. 1 and FIG. 8, the processor 41 performs an image recognizing model 410, wherein the image recognizing model 410 is a pre-trained model. Program data/codes of the image recognizing model 410 are stored in the storage component 42 for the processor 41 to access. The first communication interface 43 is signally connected to the front image-capturing device 20. The second communication interface 44 is signally connected to the rear image-capturing device 30. The third communication interface 45 is signally connected to the rearview-mirror monitor 10.

The edge computing device 40 may be connected to the rearview-mirror monitor 10, the front image-capturing device 20, and the rear image-capturing device 30 by wired connections. The first communication interface 43, the second communication interface 44, and the third communication interface 45 may be wired communication interfaces, and accordingly, the rearview-mirror monitor 10, the front image-capturing device 20, and the rear image-capturing device 30 may have built-in or external wired communication interfaces. For example, said wired communication interfaces may be, but not limited to, high-definition multimedia interface (HDMI) or universal serial bus (USB). Or, the edge computing device 40 may be wirelessly connected to the rearview-mirror monitor 10, the front image-capturing device 20, and the rear image-capturing device 30. The first communication interface 43, the second communication interface 44, and the third communication interface 45 may be wireless communication interfaces, and accordingly, the rearview-mirror monitor 10, the front image-capturing device 20, and the rear image-capturing device 30 may have built-in or external wireless communication interfaces. For example, said wireless communication interface may be, but not limit to, Bluetooth or Bluetooth Low Energy (BLE).

With reference to FIG. 8, the processor 41 of the edge computing device 40 may receive the front driving image IM_f and the rear driving image IM_r from the front image-capturing device 20 and the rear image-capturing device 30 respectively in real time, and then input the front driving image IM_f and the rear driving image IM_r into the image recognizing model 410. By the image recognizing model 410, the processor 41 may recognize a vehicle object (Obj) from the front driving image IM_f or the rear driving image IM_r, and determines whether to activate the rearview-mirror monitor 10 to display a warning image according to the vehicle object (Obj). Preferably, the warning image may include a pattern of a light ring. Therefore, by the image recognizing model 410, the edge computing device 40 can perform real-time AI (artificial intelligence) detection and real-time AI warning for vehicles.

Figure 9:
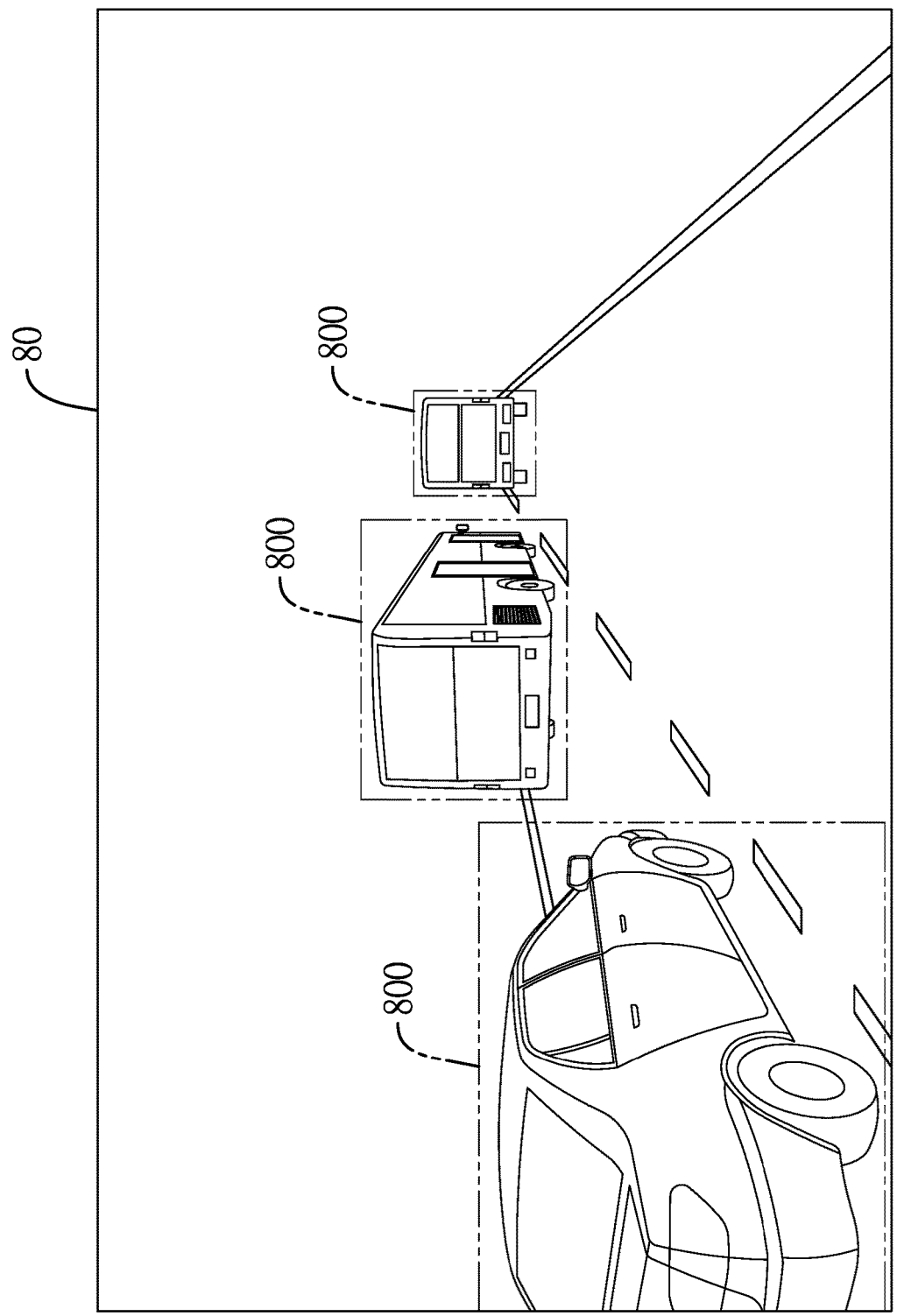
FIG. 9 is a schematic view of the training-image sample for training the image recognizing model of the present invention.
Figure 10:
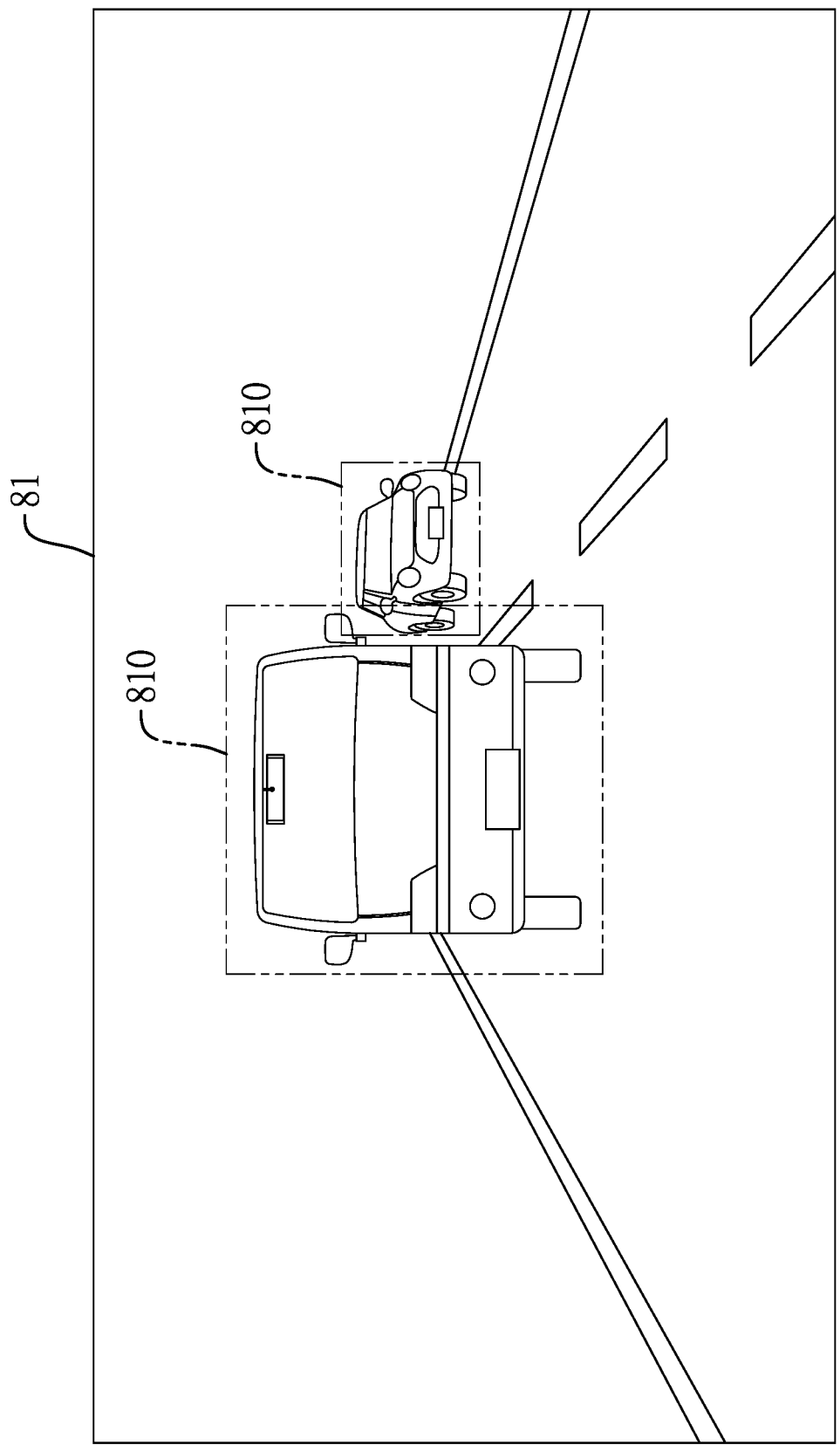
FIG. 10 is a schematic view of the training-image sample for training the image recognizing model of the present invention.

The image recognizing model 410 could be a conventional art, so its algorithm is not detailedly described herein. For example, "YOLO" is a convolutional neural network (CNN) model for objects recognition, and "YOLO" may be referred to at the website https://pjreddie.com. To train an untrained model, the untrained model is provided with a lot of training-image samples and vehicle-feature labels. Vehicle types of the vehicle-feature labels may include large vehicles (such as trucks, buses, engineering vehicles, and so on), or further include medium and small vehicles (such as motorcycles, scooters, sedans, sport utility vehicles (SUV), and so on). The tool to establish the vehicle-feature labels could be "LabelImg", and "LabelImg" may be referred to at the website https://github.com/tzutalin/labelImg. FIG. 9 discloses an example of the training-image sample 80 showing the scene in front of the vehicle. A user can use the "LabelImg" tool to select a vehicle figure 800 in the training-image sample 80 to establish its vehicle-feature label. FIG. 10 discloses another example of the training-image sample 81 showing the scene behind the vehicle. A user can use the "LabelImg" tool to select a vehicle figure 810 in the training-image sample 81 to establish its vehicle-feature label. It is to be noted that the CNN model for object recognition is the prior art, and the introduction of the model is just for examples, such that the above-mentioned model would not limit the patent scope of the present invention.

Hence, after being trained by the training-image samples and the vehicle-feature labels, the untrained model becomes the image recognizing model 410 that is well trained. Said training for the image recognizing model 410 could be performed in a personal computer (PC). The data/codes of the image recognizing model 410 could be stored in the storage component 42 for the processor 41 to access and execute.

Figure 11:
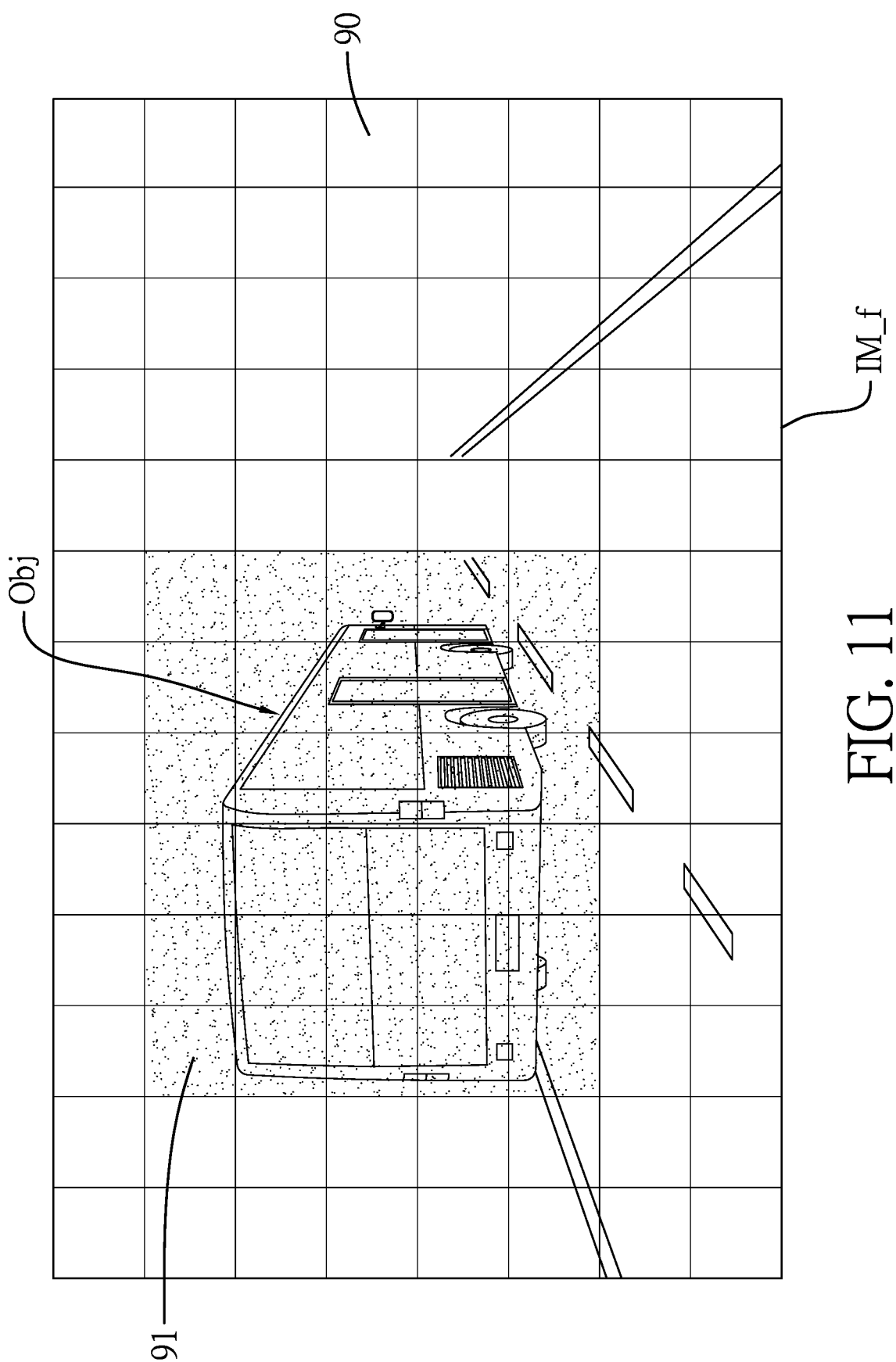
FIG. 11 is a schematic view of a front driving image outputted from the front image-capturing device of the present invention.

Regarding the determination to activate the rearview-mirror monitor 10 to display the warning image, at first, when the processor 41 recognizes the vehicle object (Obj) in the front driving image IM_f as an example, the processor 41 may compute a ratio of a size of the vehicle object (Obj) to a size of the front driving image IM_f. For example, With reference to FIG. 11 disclosing an example of the front driving image IM_f, the processor 41 may divide the front driving image IM_f into m×n blocks 90, wherein m and n are positive integers. In FIG. 11, the front driving image IM_f is divided into one hundred and four blocks 90. The processor 41 of the edge computing device 40 computes a number of a part of the blocks 90 overlapping the vehicle object (Obj), wherein the number is defined as an overlapping number. The overlapping number reflects the ratio of the size of the vehicle object (Obj) to the size of the front driving image IM_f. In other words, when the overlapping number (such as the overlapped blocks 91 shown in FIG. 11) becomes higher, the ratio of the size of the vehicle object (Obj) to the size of the front driving image IM_f becomes higher accordingly. The above-mentioned condition indicates that a substantial distance between the recognized vehicle and the host vehicle becomes shorter. Oppositely, when the overlapping number becomes fewer, the ratio of the size of the vehicle object (Obj) to the size of the front driving image IM_f becomes lower accordingly. The above-mentioned condition indicates that a substantial distance between the recognized vehicle and the host vehicle becomes longer. The processor 41 of the edge computing device 40 may control the warning image according to the ratio of the size of the vehicle object (Obj) to the size of the front driving image IM_f described as follows.

Figure 12:
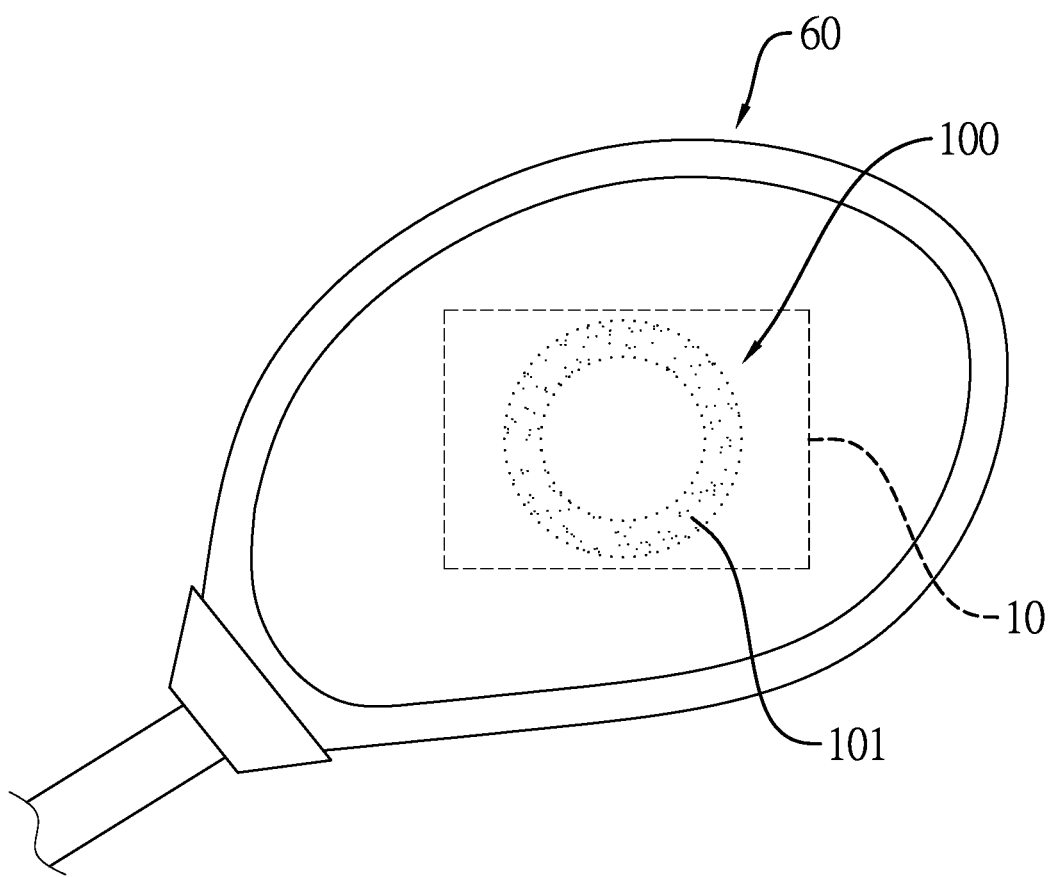
FIG. 12 is a schematic view of the rearview-mirror monitor of the present invention displaying a warning image.

When the processor 41 of the edge computing device 40 determines that the overlapping number is higher than or equal to an early-warning threshold value, with reference to FIG. 12, the processor 41 activates the rearview-mirror monitor 10 to display the warning image 100 as an early-warning function, wherein the warning image 100 includes a pattern of a light ring 101. Hence, when the driver of the host vehicle observes the light ring 101, the driver of the host vehicle may become more aware of a large vehicle in front of the host vehicle. At that time, the driver of the host vehicle may raise the awareness in advance and adopt an action, so as to decelerate the host vehicle in advance.

Figure 13:
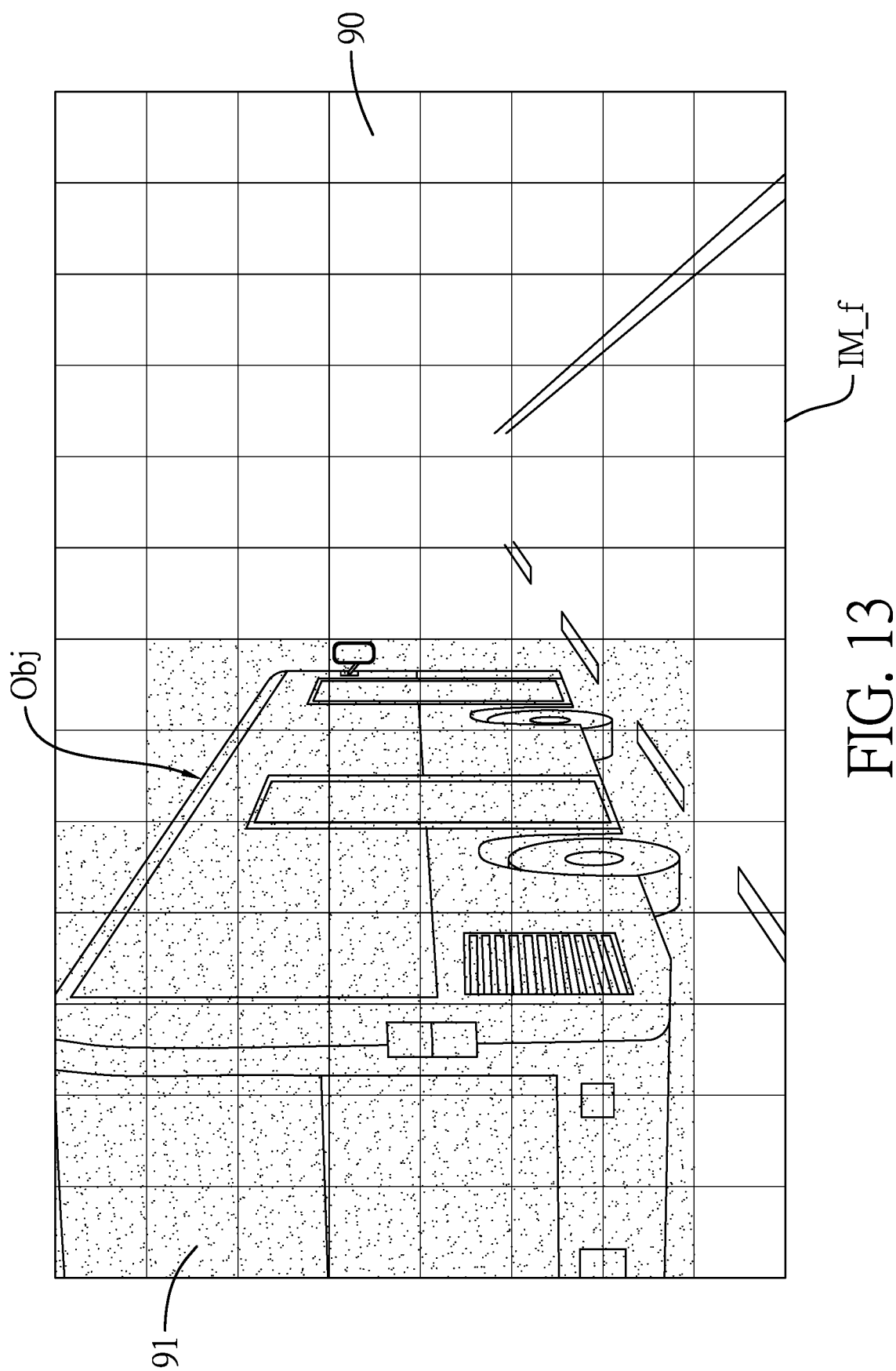
FIG. 13 is a schematic view of another front driving image outputted from the front image-capturing device of the present invention.
Figure 14:
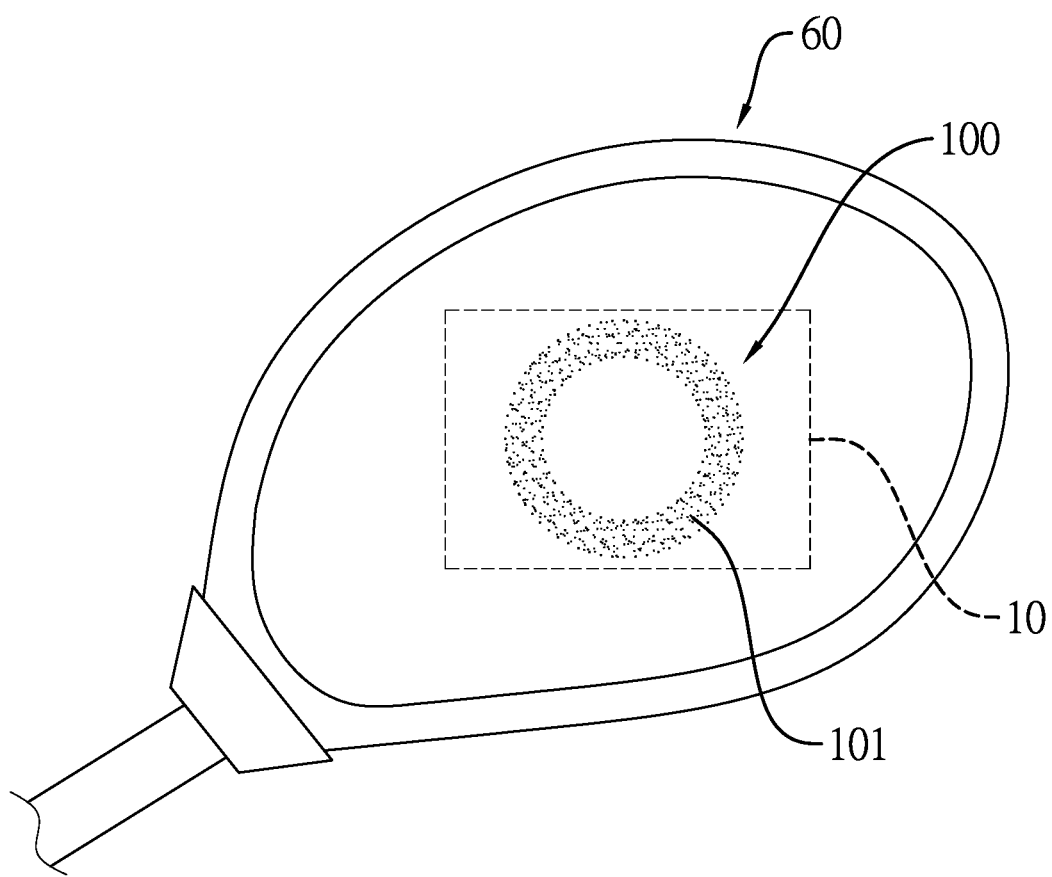
FIG. 14 is a schematic view of the rearview-mirror monitor of the present invention displaying another warning image.

With reference to FIG. 13, when the host vehicle is approaching the large vehicle, the ratio of the size of the vehicle object (Obj) to the size of the front driving image IM_f becomes higher. When the processor 41 of the edge computing device 40 determines that the overlapping number is higher than or equal to a warning threshold value, the processor 41 controls the warning image 100 to vary the light ring 101 as a warning function, so as to have color variation. In comparison with the light rings 101 shown in FIG. 12 and FIG. 14, the light rings 101 are illustrated as schematic dotted patterns, and their dotting densities reflect the color variation. The light ring 101 of FIG. 14 has higher dotting density than the light ring 101 of FIG. 12. For example, the light ring 101 may become a darker color as shown in FIG. 14 from a lighter color as shown in FIG. 12. Or, in another embodiment, the light ring 101 may become red as shown in FIG. 14 from orange as shown in FIG. 12. Hence, the driver observes the color variation of the light ring 101, which means the host vehicle is very close to the large vehicle, the color variation may warn the driver of the host driver to adopt an action, such as parking the host vehicle at road side.

The early-warning threshold value and the warning threshold value are adjustable predetermined values stored in the processor 41 or the storage component 42, wherein the warning threshold value is higher than the early-warning threshold value. For example, the front driving image IM_f as shown in FIG. 11 and FIG. 13 is divided into one hundred and four blocks, the early-warning threshold value may be preset as 30, and the warning threshold value may be preset as 40. In particular, the early-warning threshold value and the warning threshold value are adjustable according to the number of the blocks divided from the front driving image IM_f or the rear driving image IM_r, or according to the type of the vehicle object (Obj).

Similarly, the recognition function to the vehicle object, the early-warning function, and the warning function for the rear driving image IM_r could be deduced from those for the front driving image IM_f performed by the processor 41, and are not detailedly and repeatedly described herein. In other words, because the processor 41 of the edge computing device 40 receives the front driving image IM_f and the rear driving image IM_r at the same time, the processor 41 may perform the early-warning function and the warning function regardless that the vehicle object (Obj) is recognized from either the front driving image IM_f or the rear driving image IM_r.

In conclusion, the system of the present invention can perform real-time AI (artificial intelligence) detection and real-time AI warning for vehicles. The system of the present invention is applied to a host vehicle. Regardless that the host vehicle is a car or a scooter, especially the scooter, when the driver of the host vehicle observes the light ring 101 of the early-warning function as shown in FIG. 12, which means there may be a large vehicle in front of or behind the host vehicle, the driver of the host vehicle may raise the awareness in advance. Furthermore, under the circumstance of FIG. 13, if the host vehicle keeps moving forward, the host vehicle may enter the blind spot area of the large vehicle. Hence, in the present invention, when the driver of the host vehicle observes the light ring 101 of the warning function as shown in FIG. 14, the host vehicle has not entered the blind spot area of the large vehicle yet. Then, the driver of the host vehicle may park the host vehicle at the road side or follow the large vehicle before entering the blind spot area of the large vehicle. As a result, the host vehicle will not enter the blind spot area of the large vehicle. For example, the host vehicle may wait for moving forward until the large vehicle finishes a turning, so as to effectively avoid a traffic accident with the large vehicle.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vehicle rearview warning system comprising:
a rearview-mirror monitor;
a front image-capturing device outputting a front driving image;
a rear image-capturing device outputting a rear driving image;
an edge computing device signally connected to the rearview-mirror monitor, the front image-capturing device, and the rear image-capturing device; and
the edge computing device receiving the front driving image and the rear driving image respectively, recognizing a vehicle object from the front driving image or the rear driving image, and determining whether to activate the rearview-mirror monitor to display a warning image according to the vehicle object; wherein
the edge computing device controls the warning image according to a ratio of a size of the vehicle object to a size of the front driving image or the rear driving image;
the edge computing device divides the front driving image or the rear driving image into m×n blocks, wherein m and n are positive integers;
the edge computing device computes a number of a part of the blocks overlapping the vehicle object, and the number is defined as an overlapping number;
when the edge computing device determines that the overlapping number is higher than or equal to an early-warning threshold value, the edge computing device activates the rearview-mirror monitor to display the warning image, wherein the warning image includes a pattern of a light ring; and
when the edge computing device determines that the overlapping number is higher than or equal to a warning threshold value, the edge computing device controls the warning image to vary the light ring, wherein the warning threshold value is higher than the early-warning threshold value.

2. The vehicle rearview warning system as claimed in claim 1, wherein the front image-capturing device and the rear image-capturing device are equipped with wide-angle lenses respectively.

3. The vehicle rearview warning system as claimed in claim 1, wherein the early-warning threshold value and the warning threshold value are adjustable predetermined values.

4. The vehicle rearview warning system as claimed in claim 1, wherein the edge computing device is connected to the rearview-mirror monitor, the front image-capturing device, and the rear image-capturing device by wired connections.

5. The vehicle rearview warning system as claimed in claim 1, wherein the edge computing device is wirelessly connected to the rearview-mirror monitor, the front image-capturing device, and the rear image-capturing device.

* * * * *